United States Patent

Miyashita

[11] Patent Number: 5,482,145
[45] Date of Patent: Jan. 9, 1996

[54] DISK BRAKE ASSOCIATED WITH HAND BRAKE LEVER

[75] Inventor: Kenji Miyashita, Yamanashi, Japan

[73] Assignee: Tokico Ltd., Kanagawa, Japan

[21] Appl. No.: 287,898

[22] Filed: Aug. 9, 1994

[30] Foreign Application Priority Data

Aug. 9, 1993 [JP] Japan .................................. 5-217043

[51] Int. Cl.$^6$ .................................................. F16D 65/16
[52] U.S. Cl. ...................... 188/72.9; 188/72.3; 188/72.7; 188/106 F
[58] Field of Search ................................ 188/72.9, 72.8, 188/72.7, 72.6, 106 F, 72.3, 216

[56] References Cited

U.S. PATENT DOCUMENTS

| 3,954,158 | 5/1976 | Rist .......................................... 188/72.9 |
| 4,077,498 | 3/1978 | Brown et al. ........................ 188/72.9 X |
| 4,643,278 | 2/1987 | Thiel et al. ...................... 188/106 F X |

FOREIGN PATENT DOCUMENTS 2239066  6/1991  United Kingdom .................. 188/72.7

Primary Examiner—Douglas C. Butler
Attorney, Agent, or Firm—Wenderoth, Lind & Ponack

[57] ABSTRACT

The present invention provides a disk brake including a cam shaft rotatably mounted on a cylinder portion of a caliper and having an end portion protruding from the caliper, a brake lever fitted to the protruding end portion of the cam shaft so as to rotate the cam shaft when the brake lever rotates, and a helical return spring disposed above a fitting portion of the brake lever fitted to the cam shaft and fitted around the protruding end portion of the cam shaft. The spring has one end secured to the caliper. The brake lever is provided with a plate-like vertical portion extending in the axial direction of the cam shaft from the fitting portion toward a tip of the protruding end portion of the cam shaft. The vertical portion is provided at one side thereof with a bent lug to which the other end of the return spring is secured. The bent lug extends away from the cam shaft.

2 Claims, 4 Drawing Sheets 5,482,145

DISK BRAKE ASSOCIATED WITH HAND BRAKE LEVER

BACKGROUND OF THE INVENTION

1. Field of the Invention

The present invention relates to a disk brake incorporating a hand brake operating mechanism.

RELATED BACKGROUND ART

Disk brakes incorporating a hand brake operating mechanism are well known. In such conventional disk brakes, a cam shaft is rotatably provided on a cylinder portion of a caliper and a brake lever Is secured to the cam shaft so that, when a driver Dulls a hand brake lever disposed in a driver's compartment, the brake lever is rotated via a connecting device, thereby rotating the cam shaft. By the rotation of the cam shaft, a piston slidably mounted within a cylinder is driven toward a corresponding friction pad, thereby providing a braking action of the disk brake.

The brake lever comprises a fitting portion secured to the cam shaft, a rising portion extending from the fitting portion along the cam shaft, and an operating end portion extending from the rising portion in a direction substantially perpendicular to the cam shaft. The operating end portion is provided with a section to which one end of a hand brake cable is attached, and a section to which one end of a return spring for returning the brake lever is attached.

Since the cam shall extends toward a centerline of a vehicle wheel, there is a danger of interference between the cam shaft and elements associated with the vehicle wheel such as a drive shaft. In particular, the operating end portion of the brake lever extending from a tip end of the cam shaft in the direction substantially perpendicular to the cam shaft is apt to be interfered with by such elements.

SUMMARY OF THE INVENTION

An object of the present invention is to provide an improved disk brake associated with a hand brake lever.

To achieve the above object, according to the present invention, there is provided a disk brake comprising a cam shaft rotatably provided on a cylinder portion of a caliper and having a protruded end portion, a brake lever fitted on the protruded end portion of the cam shaft to rotate the cam shaft, and a coil-shaped return spring disposed above a fitting portion of the brake lever and filled onto the protruded end portion of the cam shaft and having one end secured to the caliper. The brake lever is provided with a plate-shaped vertical rising portion extending from the fitting portion toward a tip end of the protruded end portion of the cam shaft along an axial direction of the cam shaft, and the vertical rising portion is provided at its one side with a bent lug to which the other end of the return spring is secured.

The other objects, features and advantages of the present invention will be apparent from the following detailed explanation of the invention referring to the accompanying drawings.

DETAILED DESCRIPTION OF THE PREFERRED EMBODIMENTS

Prior to a detailed explanation of the present invention, an example of a conventional disk brake will be described with reference to FIGS. 3 to 5.

Figure 3:
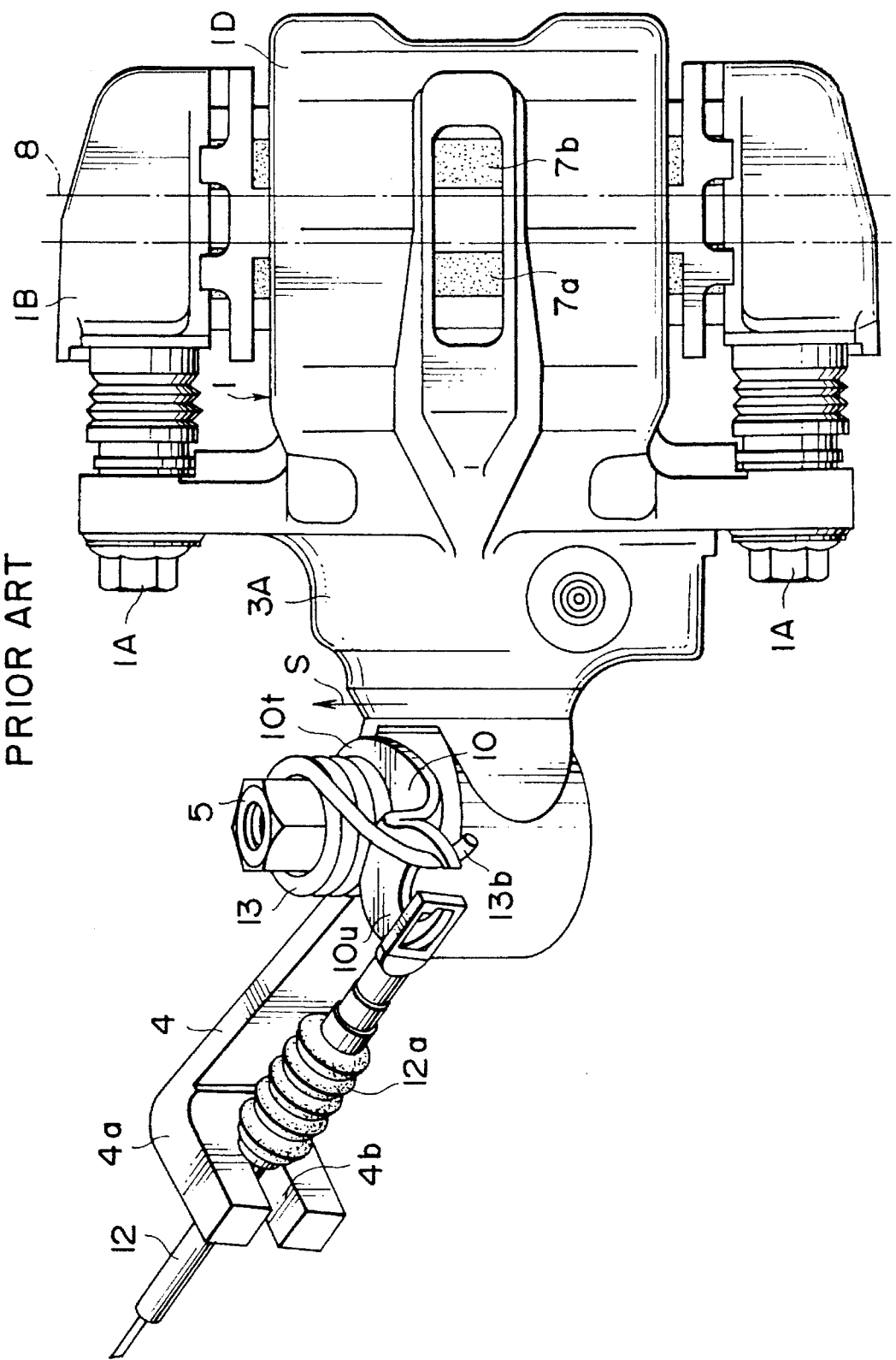
FIG. 3 is a perspective view of a conventional disk brake.
Figure 4:
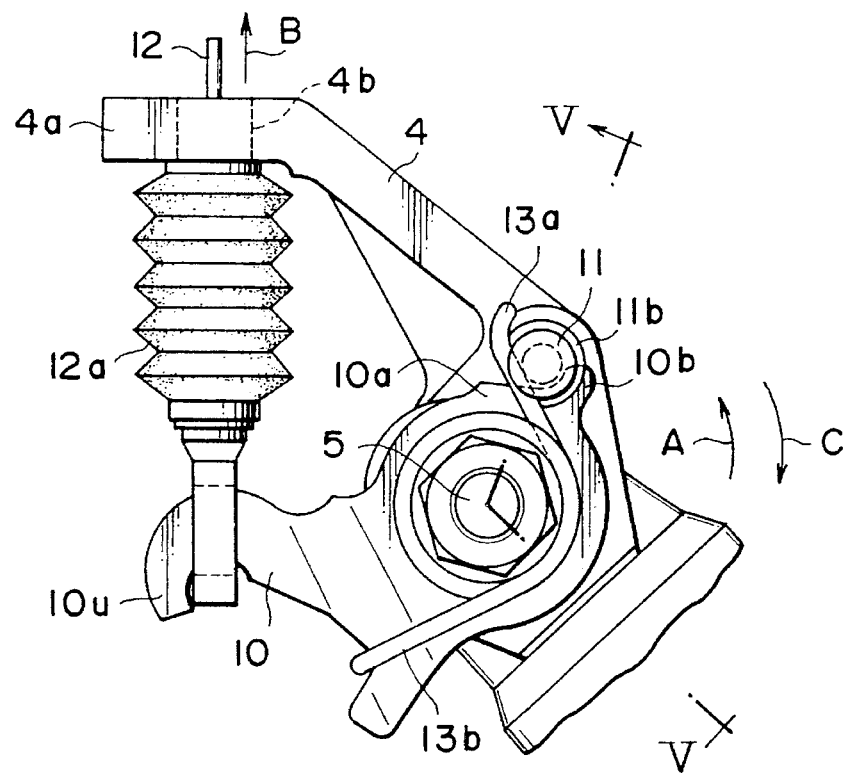
FIG. 4 is a plan view of a portion of the disk brake of FIG. 3.
Figure 5:
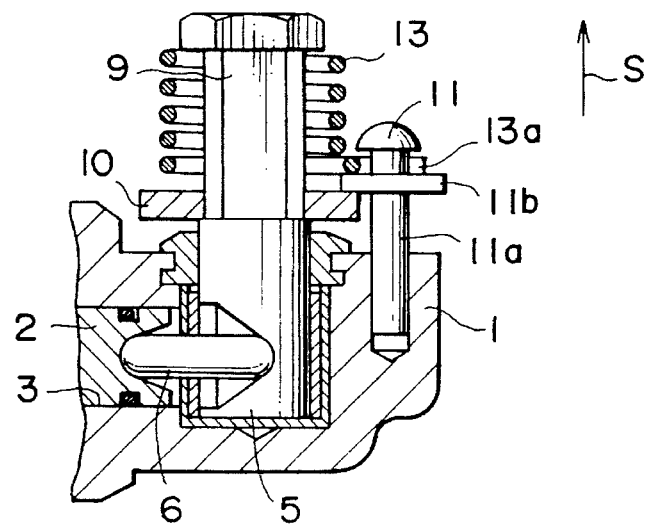
FIG. 5 is a sectional view taken along the line V—V in FIG. 4.

In FIGS. 3 to 5, a carrier 1B is secured to a stationary portion of an automobile at one side of a disk 8 which is rotatable together with a vehicle wheel. A pair off friction pads disposed on both sides of the disk 8 are slidably supported by the carrier 1B. Further, a caliper 1 is slidably supported on the carrier 1B via two slide pins 1A. A lever guide 4 protrudes rearwardly from a cylinder portion 3A of the caliper 1.

An arm portion 1D of the caliper 1 straddles the disk 8 and friction pads 7a, 7b, and is bent at its free end in an axial direction of the disk 8 to form a pawl by which the friction pad 7b is engaged. The cylinder portion 3A of the caliper 1 is provided with a cylinder 3 within which two pistons are slidably mounted. These two pistons are engaged with each other via a gap adjusting member (not shown) disposed between the pistons. The piston 2 shown in FIG. 5 Is an outer one of these pistons, and the other inner piston (not shown) serves to directly drive the friction pad 7a.

A cam shaft 5 Is rotatably provided on the caliper 1, which cam shaft extends in a direction perpendicular to an axis of the cylinder 3. A connecting rod 6 is disposed between the cam shaft 5 and the piston 2 so that rotational movement of the cam shaft 5 can be transmitted to the piston 2 through the connecting rod 6 to move the piston in an axial direction. A portion 9 of the cam shaft 5 protrudes from the caliper 1, and a brake lever 10 for rotating the cam shaft 5 is attached to the protruding portion 9 of the cam shaft.

Although the cam shaft 5 actually extends substantially toward the centerline of the associated vehicle wheel, in order to clearly illustrate various elements associated with the cam shaft, the cam shaft is shown to be oriented as shown In FIG. 3.

The brake lever 10 has a substantially flat fitting portion 10t which is attached to the cam shaft 5 to prevent relative rotation between the cam shaft and the fitting portion. The fitting portion 10t of the brake lever 10 is provided with a flange contacting portion 10a having an arcuate peripheral portion. A projection 10b contiguous to the flange contacting portion 10a protrudes outwardly. The projection 10b abuts against a shaft portion 11a of a stopper 11 (fully described later) secured to the caliper 1 at a position below a flange 11b so that rotation of the brake lever in a return direction (shown by the arrow A) by means of a return spring 13 (described later) is prevented. A vertical rising portion (not designated by a reference numeral) is formed on the fitting portion 10t of the brake lever 10. The vertical rising portion extends along the cam shaft 5 substantially in a direction toward the centerline of the wheel. Although this direction is shown by the arrow S in FIG. 3 which also shows the direction of the cam shaft 5, as mentioned above, the arrow S is oriented substantially toward the centerline of the wheel in reality. A tip end portion 10u is bent from the vertical rising portion by 90 degrees. A boot 12a for covering one end of a cable 12 is arranged between the tip end portion 10u of the brake lever 10 and a tip end portion 4a of the lever guide 4. One end of the cable 12 is connected to the tip end portion 10u of the brake lever 10, and the cable is passed through a groove 4b formed in the tip end portion 4a of the lever guide 4 and is connected at the other end to a hand brake lever (not shown) in a driver's compartment.

The coil-shaped return spring 13 is fitted on the protruded portion 9 of the cam shaft 5 above the fitting portion 10t of the brake lever 10. One end 13a of the return spring 13 is engaged by the shaft portion 11a of the stopper 11 at a position above the flange 11b and the other end 13b of the return spring is engaged by the brake lever 10 so that the brake lever 10 is always biased toward the direction shown by the arrow A under the action of the return spring.

The stopper 11 has the shape of a rod and is secured to the caliper 1 near the cam shaft 5. The flange 11b interposed between one end 13a of the return spring 13 and the flange contacting portion 10a of the brake lever 10 is formed on the shaft portion 11a off the stopper 11 at an intermediate position thereof.

In such a conventional disk brake, when the driver pulls the hand brake 1, ever disposed in the driver's compartment, the cable is shifted in a direction shown by the arrow B. This shifting movement of the cable causes the brake lever 10 to rotate in an operative direction (shown by the arrow C) In opposition to a spring force of the return spring 13. At the same time, the cam shaft 5 is rotated in the same direction. Rotation of the cam shaft 5 causes two pistons to shift in the axial direction via the connecting rod 6, thereby urging the friction pad 7a against one side of the disk 8. Further, due to reaction, the caliper 1 is shifted in a direction opposite to the shifting direction of the pistons, thereby urging the friction pad 7b against the other side of the disk 8. In this way, the function of the parking brake is achieved.

On the other hand, when the disk brake is used as a foot brake, the driver depresses a brake pedal, disposed in the driver's compartment with his foot to supply pressurized oil from a brake master cylinder to the cylinder 3 at a point between the pistons. As a result, the friction pad 7a is directly shifted by the inner piston mounted within the cylinder 3 against one side of the disk 8, and, at the same time, due to the reaction, the caliper 1 is shifted in the direction opposite to the shifting movement of the piston, thereby urging the friction pad 7b against the other side of the disk 8. In this way, the braking action is achieved.

By the way, in disk brakes, in order to avoid interference between a drive shaft and other elements (for example, a shaft boot) arranged near a vehicle wheel, a return spring and attaching portions therefor are preferably spaced apart from the centerline of the vehicle wheel as much as possible. However, in the above-mentioned disk brake, the attachment portion for arresting the other end 13b of the return spring 13 is formed in the flat tip end portion 10u. Since the tip end portion 10u is offset by means of the vertical rising portion from the fitting portion lot toward the centerline of the wheel, the above requirement cannot be satisfied. That is to say, there is a danger of interference between the attachment portion itself and the elements arranged near the wheel, and, since the other end 13b of the return spring 13 extends from the cam shaft 5 in the direction perpendicular to the cam shaft, there is also a danger of interference between the other end 13b and the elements arranged near the wheel.

The present invention aims at eliminating the above-mentioned drawback, and an object of the present invention is to provide a disk brake which can prevent interference between a return spring and elements arranged near vehicle wheel.

Figure 1:
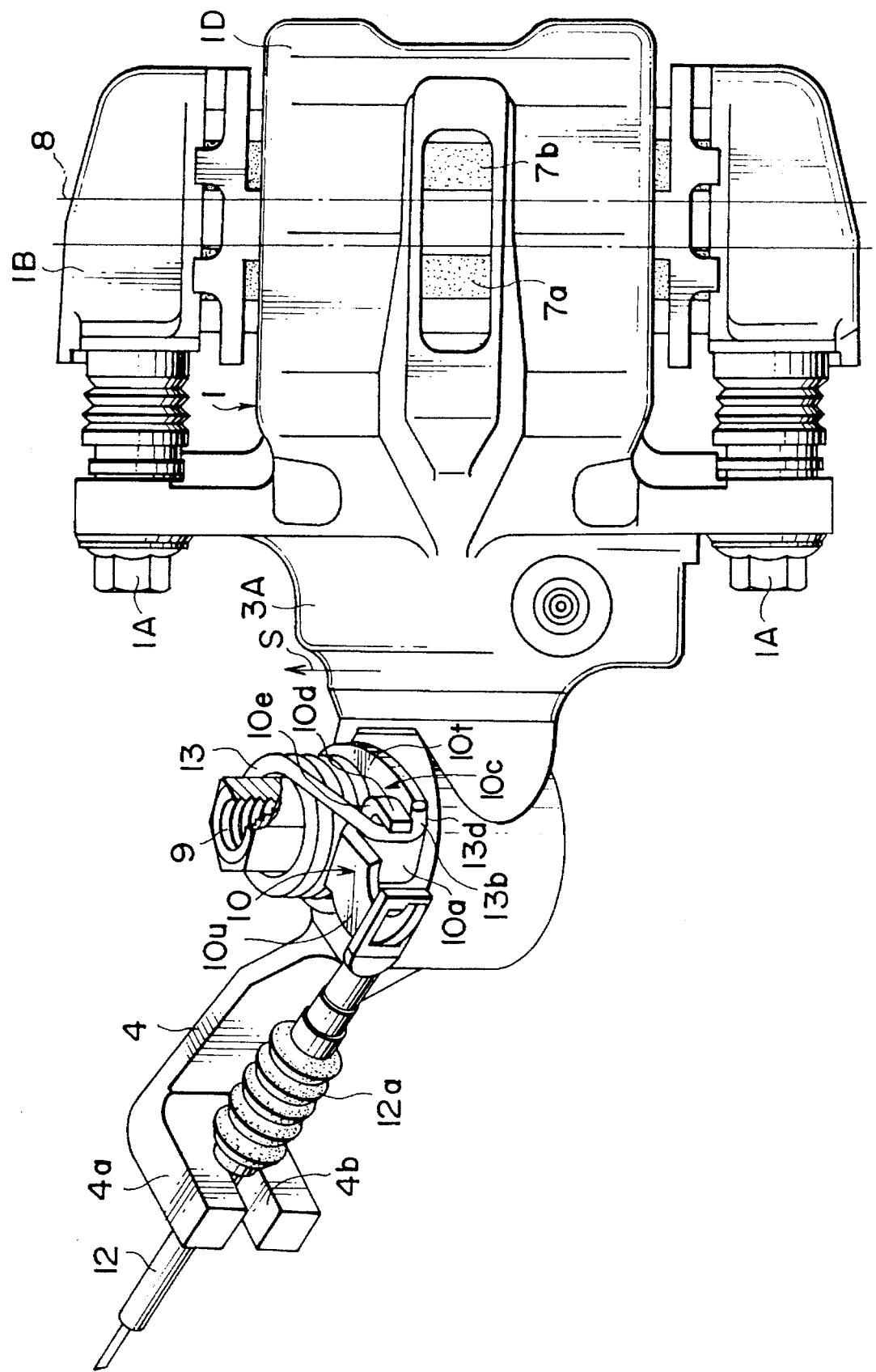
FIG. 1 is a perspective view of a preferred embodiment of a disk brake according to the present invention.
Figure 2:
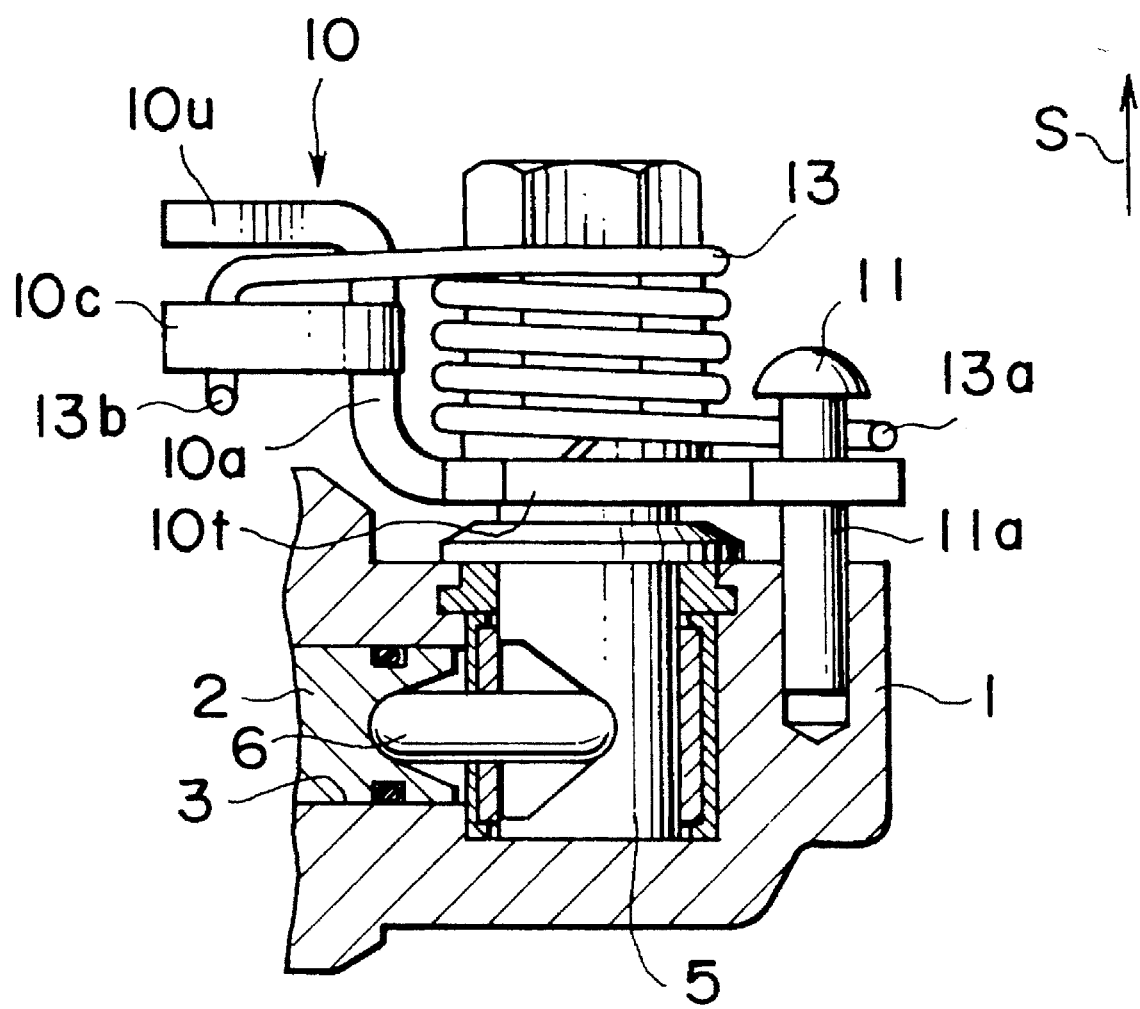
FIG. 2 is a partial sectional view of the disk brake.

Now, a disk brake according to a preferred embodiment of the present invention will be fully described with reference to FIGS. 1 and 2. Incidentally, the same members or elements as those shown in FIGS. 3 to 5 are designated by the same reference numerals and a detailed description thereof will be omitted.

In the preferred embodiment, a plate-shaped vertical rising portion 10a of a brake lever 10 is formed contiguous to a fitting portion 10t associated with a cam shaft 5. The vertical rising portion 10a extends along an axial direction of the cam shaft 5 toward a tip end of a protruded portion 9 of the cam shaft 5. A tip end or free end portion of the vertical rising portion 10a is bent at a right angle to form a tip end portion 10u to which one end of a cable 12 is connected.

A bent lug 10c having an intermediate bent portion 10e is formed on one side of the vertical rising portion 10a so that a tip end portion (referred to as "lug end portion" hereinafter) 10d protruding from the bent portion 10e extends in a direction away from the cam shaft 5. A second end or the other end 13b of a return spring 13 is attached to the bent lug 10c. In this ease, the other end 13b of the return spring 13 is bent to form an L-shaped portion 13d which is hooked to the tip end portion 10d of the bent lug, thereby positively preventing the return spring 13 from disengaging from the bent lug 10c.

In the disk brake having such an arrangement, the bent lug 10c to which the other end 13b of the return spring 13 is attached is positioned below the tip end portion 10u (at a position offset toward a base end of the cam shaft 5) and the other end 13b of the return spring 13 is also disposed at a lower position accordingly, and these portions 10c, 13b are sufficiently spaced from the centerline of the vehicle wheel. Thus, since the return spring 13 and the attachment portion therefor do not protrude toward the centerline of the wheel, interference with elements and parts associated with the wheel can be prevented.

Because the interference between the return spring 13 and the elements associated with the wheel can be prevented only by altering or changing the configuration of conventionally used parts without using new parts, the number of parts and an increase in the cost of the entire apparatus can be minimized. Further, since the return spring 13 does not protrude toward the centerline of the wheel, if a stone or the like on the road flies toward the vehicle, such a stone is not likely to hit the return spring, thereby minimizing the chance of destruction or damage of the return spring.

Incidentally, by widening the bent lug 10c of the brake lever 10, it is possible to stabilize the posture of the return spring 13.

As mentioned above, according to the present invention, since the other end of the return spring is spaced away from the centerline of the vehicle wheel more than the tip end of the brake lever, the return spring and the attachment portion therefor do not protrude toward the centerline of the vehicle wheel, thereby preventing interference of the return spring and the attachment portion therefor with the elements associated with the vehicle wheel. Further, since the interference between the return spring and the elements associated with the wheel is prevented only by altering or changing the configuration of conventionally used parts without using new parts, the number of parts and an increase in the cost of the entire apparatus can be minimized. In addition, since the return spring does not protrude toward the centerline of the wheel, if a stone or the like on the road flies toward the vehicle, such a stone is not likely to hit the return spring, thereby minimizing the chance of destruction or damage of the return spring.

What is claimed is:

1. A disk brake comprising:

a caliper having a portion in which a cylinder is defined;

a cam shaft rotatably mounted to said portion of the caliper, said cam shaft having an end portion protruding from said portion of the caliper;

a brake lever including a fitting portion fitted to said end portion of the cam shaft so as to rotate said cam shaft when the brake lever rotates, a vertical portion extending in an axial direction of said cam shaft from said fitting portion towards a tip of said end portion of the cam shaft, a tip end portion located at an end of said vertical portion remote from said fitting portion, said tip end portion being configured to receive a brake cable of a parking brake, and a lug extending from said vertical portion at a location between said tip portion and said fitting portion; and a helical return spring disposed above said fitting portion of the brake lever and fitted around the end portion of said cam shaft protruding from said caliper, said return spring having one end fixed relative to said portion of the caliper and another end engaged with said lug at a location between said tip portion and said fitting portion of the brake lever with respect to the axial direction of said cam shaft.

2. A disk brake according to claim 1, wherein said lug has a tip end portion extending in a direction away from said cam shaft.

* * * * *